Nov. 26, 1935.   A. H. HABERSTUMP   2,022,036
WINDSHIELD OPENING AND CLOSING REGULATOR
Filed Sept. 1, 1932    2 Sheets-Sheet 1
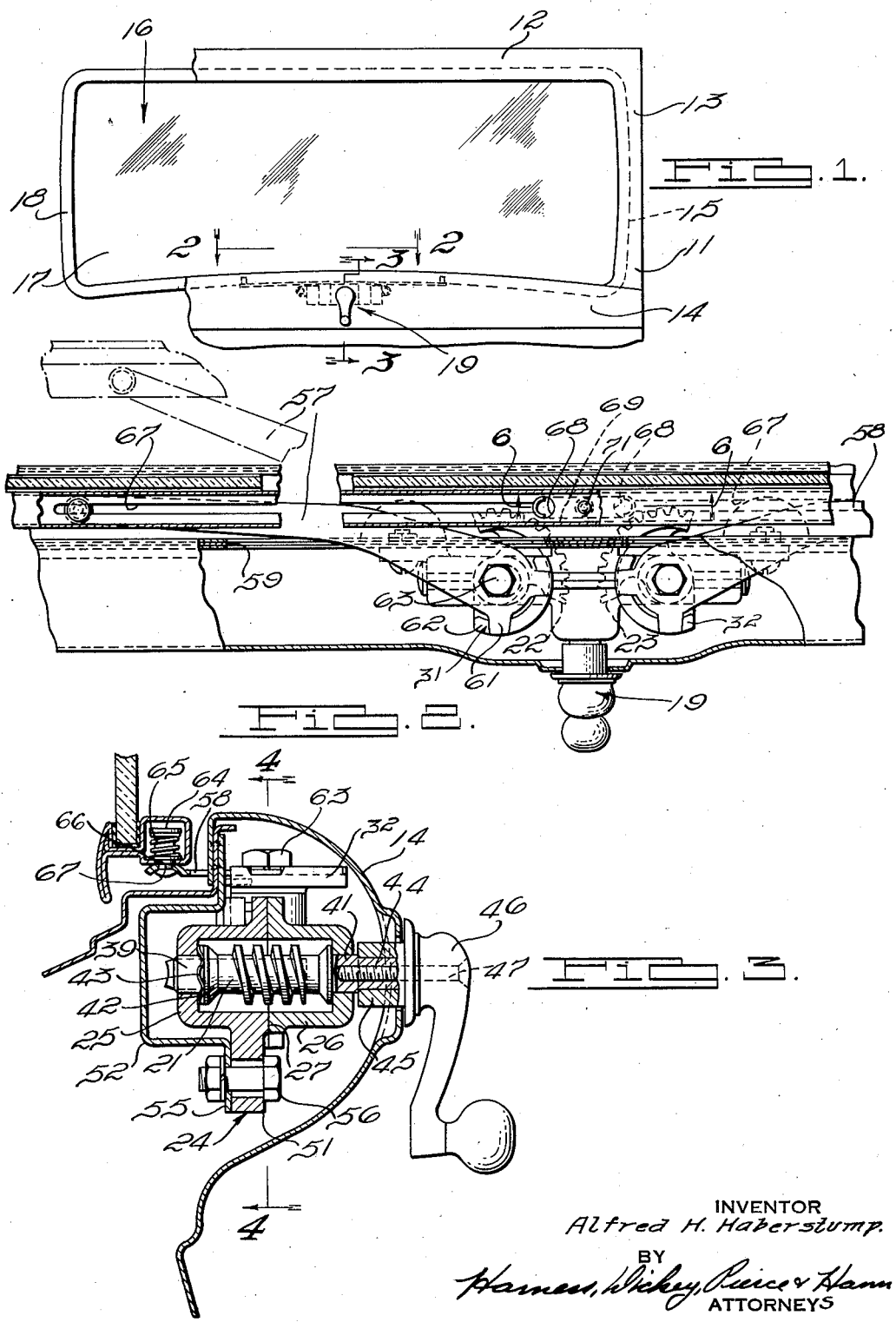
INVENTOR
Alfred H. Haberstump.
BY
ATTORNEYS Nov. 26, 1935.   A. H. HABERSTUMP   2,022,036
WINDSHIELD OPENING AND CLOSING REGULATOR
Filed Sept. 1, 1932   2 Sheets-Sheet 2

INVENTOR
Alfred H. Haberstump.
BY
Harness, Dickey, Pierce & Hann
ATTORNEYS

Patented Nov. 26, 1935

2,022,036

UNITED STATES PATENT OFFICE 2,022,036

WINDSHIELD OPENING AND CLOSING REGULATOR

Alfred H. Haberstump, Detroit, Mich., assignor to The Murray Corporation of America, a corporation of Delaware Application September 1, 1932, Serial No. 631,350

7 Claims. (Cl. 296—84)

The invention relates to windshield opening and closing regulators and particularly to a regulator of the concealed type capable of retaining the windshield at any point between complete open and closed positions through the operation of a single crank element.

Various attempts have been made heretofore to provide regulators for windshields which are simple in construction and operation and which are capable of supporting the windshield in any position without danger of damaging the windshield or the device. Very little success has been attained up to the present time, the most common type of windshield regulators being elements employed on the sides of the front pillars which clamp the windshield in open position, and while satisfactory in operation are difficult to adjust by the driver during operation of the vehicle.

In practicing my invention, I employ a crank for driving a worm which operates sectors for controlling the movement of arms which are connected to the windshield in such manner as to control the opening and closing of the windshield to lock the windshield in any predetermined position. The arms have projections on the ends thereof which operate in slots in the bottom frame of the windsheld and are so constructed as to be extended the greatest distance apart when in closed position so as to have two spaced points of pressure applied to the frame for retaining the windshield in firm fixed relation to the rabbet provided about the windshield opening. Heretofore a single point engagement was employed in the central portion of the windshield frame which resulted in the glass of the windshield being stressed when closed, which often produced breakage. The operating arms are in offset relation to the wheel sectors so as to permit the frame of the device to be mounted within the windshield frame entirely hidden from view except for the arms which project through one wall of the rabbet about the windshield opening. These are completely concealed however when the windshield is closed and the ends of the arms are the only portions of the regulator visible when the windshield is open. The arms are constructed of flexible material to follow the arc upon which the windshield swings and thereby eliminates the hinging of the arms as has been attempted in the past and which further simplifies the structure.

The main objects of my invention are: to provide a regulator for a windshield which is completely concealed except for the operating handle therefor; to provide a regulator for a windshield having a pair of arms which are slidably attached to the windshield frame and which retains the windshield in closed position when the arms are separated; to provide a regulator having wheel sectors and a worm with arms mounted in offset relation to the sectors; to provide arms made of flexible material to permit bending to conform to the arcuate movement of the window when being opened; and in general to provide a regulator which is simple in construction, easily operated and economical of manufacture.

Other objects and features of novelty of my invention will be either specifically pointed out or will become apparent when referring, for a better understanding of my invention, to the following description taken in conjunction with the accompanying drawings, wherein:

Figure 1 is a broken view, in elevation, of a windshield having a regulator thereon, embodying features of my invention, Figure 2 is an enlarged sectional view of the structure shown in Fig. 1, taken on the line 2—2 thereof;

Fig. 3 is an enlarged sectional view of the structure illustrated in Fig. 1, taken on the line 3—3 thereof;

Figure 4:
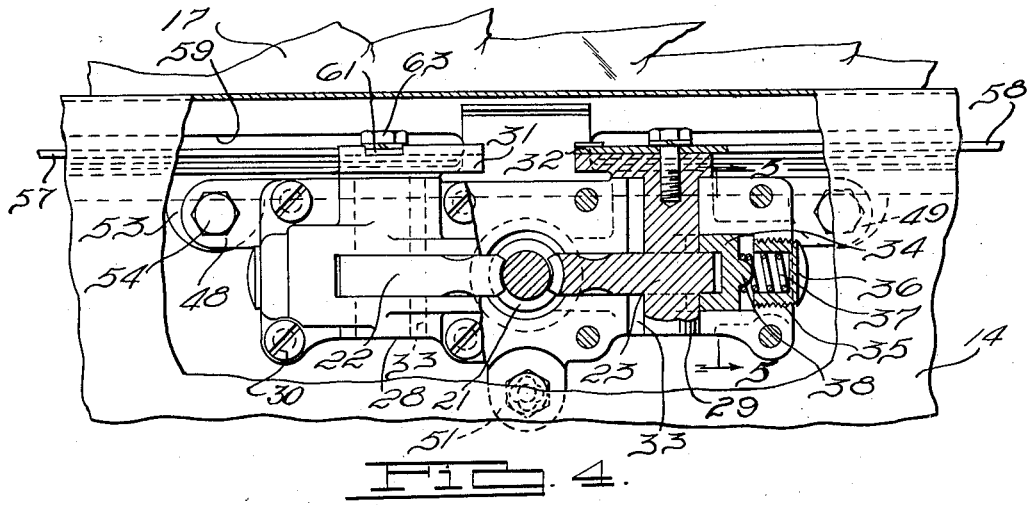
Fig. 4 is an enlarged sectional view of the structure illustrated in Fig. 3, taken on the line 4—4 thereof.

In Fig. 1, I have illustrated a windshield opening 11 formed by a header panel 12, pillar panels 13 and a dash panel 14 which forms a closure having in its peripheral edge, a rabbet 15 for receiving a windshield 16. The windshield 16 is composed of a sheet of glass 17 having a frame 18 about its peripheral edge made of metal and conforming to the contour of the rabbet. Enclosed within the dash panel 14, a windshield regulator 19 is supported for the purpose of locking the windshield 16 in clamped position within the rabbet 15 and for effecting the opening of the windshield to any predetermined limited degree and for retaining the windshield in the desired open position.

The regulator 19, as illustrated more clearly in Figs. 2, 3, and 4, comprises a worm 21 and two wheel sectors 22 and 23 which are mated together with the worm 21 within a housing 24, the housing 24 is made up of two parts 25 and 26 which are joined along the line 27 by the bolts 30 to form the unit housing 24. The sectors 22 and 23 have shafts 28 and 29, an integral part thereof which terminates in flanges 31 and 32, respectively, at the top. The unit construction of the wheel sectors, shafts and flanges, is formed preferably by casting, and more particularly by die casting, although it is to be understood that the elements may be made up separately and assembled to form the unit structure.

Figure 5:
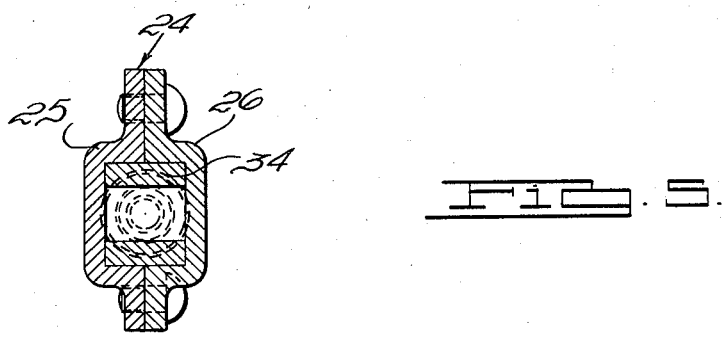
Fig. 5 is a sectional view of the structure illustrated in Fig. 4, taken on the line 5—5 thereof.

The housing 24 is provided with elongated apertures 33 for receiving the shafts 28 and 29, which permits movement toward and away from each other but prevents movement laterally thereof. Bearing elements 34 span the rear end of the wheel sectors 22 and 23 and engage the rear side of the shafts 28 and 29 for providing a bearing therefor. The bearing 34 in this manner positions the rear portion of the shaft and sectors 22 and 23, while the slots in which the wheel sectors operate, guide the front end thereof and retain the sectors in predetermined relation to the worm 21. The bearing 34 is rectangular in shape, as illustrated more particularly in Fig. 5, and is contained within a square recess against rotation but has sufficient clearance to slide therewithin. Rearwardly of the recess an aperture 35 is provided having internal threads for receiving a cap nut 36 wherein a spring 37 is mounted positioned by a projection 38 on the bearing 34 to be employed for urging the bearing against the shafts 28 and 29. The purpose of this construction is to take up any play which may occur between the sectors and worm due to wear to thereby eliminate any backlash from the device and forms a rigid lock for the window in any of its positions. It is to be understood that the worm and wheel sectors have teeth constructed of such pitch as to be non-reversible in operation, that is to say, such pitch as to prevent the worm being operated by a pressure applied to the wheel sectors 22 and 23.

The worm 21 is provided with end bearings 39 and 41 which are engaged in apertures in the housing elements 25 and 26, respectively, between one wall of which and a flange 42 of the worm, a spring washer 43 is provided for taking up any wear which may occur between the bearing flanges 42 and the walls of the housing element. It is to be understood that a take up device similar to that above described in regard to the bearing 34, cap 36 and spring 37, may be utilized in place of the washer 43 for taking up any play in the worm. A square handle extension 44 is provided on the bearing 41, which is engaged by a square aperture in a boss 45 on a handle 46 which is retained thereon by a screw 47 threaded within the bearing 41 and bearing extension 44, as illustrated in Fig. 3.

Mounting bosses 48, 49 and 51 are provided on the housing element 25, as illustrated in Figs. 3 and 4, for the purpose of securing the regulator on the dash brace element 52. Semi-circular lips 53 are struck from the brace 52 having apertures therein through which bolt 54 extends for retaining the bosses 48 and 49 in firm fixed relation to the frame 52. The lower flange 55 of the brace element has an aperture therein, through which a bolt 56 extends for clamping the lower boss 51 thereto. In this manner the regulator is completely concealed within the dash panel 14 of the body with the handle portion 46 being the only part thereof which is visible to an observer.

A pair of arms 57 and 58 are employed for joining the ends of the shafts 28 and 29 to the windshield frame 18 and are made of a flexible material which will bend to conform to the arc of movement of the lower edge of the windshield frame. Slots 59 are provided between the brace 52 and the flanged edge of the dash panel 14 through which the arms 57 and 58 extend for engaging the frame. The ends of the arms engaging the shaft are enlarged and provided with projections 61 which are recessed between upstanding portions 62 of the shaft flanges 31 and 32, and are retained thereon by bolts 63 which extend through the arms into the shafts 28 and 29, as illustrated more clearly in Fig. 4. The arms are rigid on the shafts and eliminate any play which would otherwise exist therebetween and rigidly support the windshield when in any position. The opposite ends of the arms 57 have shouldered pins 64 riveted thereto on which are provided springs 65 and washers 66 for retaining the ends of the arms in firm relation in slots 67 provided in the lower end of the windshield frame 18. The slots 67 extend along the lower edge of the windshield frame, as illustrated in Fig. 2, which are enlarged at the center of the windshield into apertures 68 for receiving the pins 64. After the pin has been inserted within the aperture 68, the washer 66 thereon is forced inwardly and the arm moved outwardly to have the washer biased against the inner surface of the frame 18. A cover element 69 is then screwed onto the lower surface of the frame to cover the apertures 68 and prevent the arms from being moved out of the slot 67. The plate is illustrated in Fig. 6, as being of such extent as to project into the apertures 68 and is retained thereon by a screw 71.

Figures 6, 7:
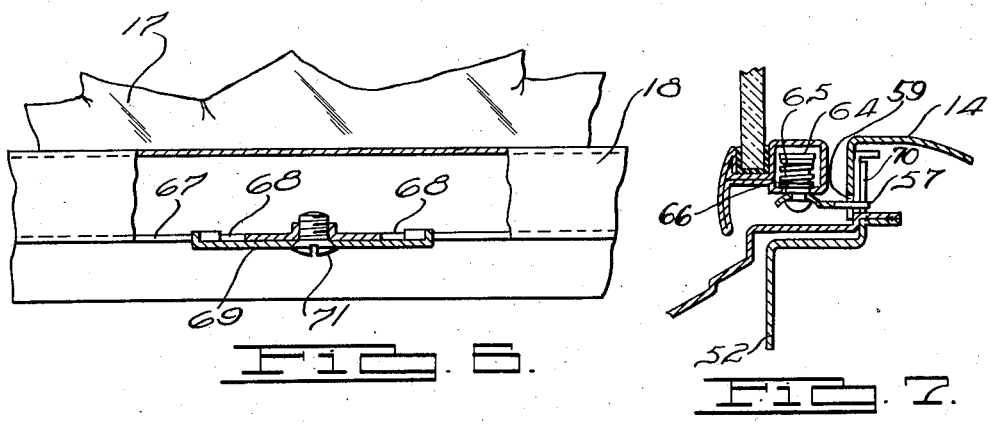
Fig. 6 is an enlarged sectional view of the structure illustrated in Fig. 2, taken on the line 6—6 thereof.
Fig. 7 is an end view of the structure illustrated in Fig. 6.

Referring to Fig. 7, the slots 59 are formed by providing longitudinally extending notches in the flange of the dash panel 14 and the flange on the cowl, the latter being extended inwardly of the body and welded to the cowl brace 52. An upstanding tongue 70 is provided at the central portion of the cowl to divide the slot into two portions and to form an anchor to which a downwardly disposed tongue on the dash panel is secured. The tongue on the dash panel 14 is of predetermined width to function as a stop for limiting the outward movement of the arms 57, and when employed the stop plate 69 on the windshield frame may be omitted. By constructing the slot 59 in this manner, the cowl structure is strengthened rather than weakened, as would occur if the slot were otherwise formed.

When the windshield is in closed position the arms 57 and 58 are angularly disposed relative to each other the greatest amount, substantially 180 degrees, to have the end portions thereof in longitudinal extension of each other resting within the rabbet 15 to form a two point clamp for retaining the windshield in fixed relation relative to the rabbet. The two point clamp thus formed is very desirable, since a single point clamp at the central portion of the windshield might stress one side or the other of the windshield a greater amount which would cause the glass to be cracked or broken.

The regulator thus constructed is exceedingly rigid and by having the back lash eliminated from between the worm and the wheel sectors, a rigid clamp is provided which eliminates vibration of the windshield or any movement thereof when in open or closed position. The lead of the worm thread is such as to prevent any force applied to the windshield from operating the worm through the wheel sectors which thereby forms a clamp to lock the windshield in any position. The arms are so engaged to the ends of the shaft of the wheel sectors as to substantially form a unit engagement therewith so that no play is likely to occur in view of the presence of the projections 61 thereon which are recessed within the flanges of the shafts. The flexibility of the arms permits the arcuate movement of the bottom edge of the frame 18 without the necessity of employing hinges or jointed connections while the pins 64 are of such diameter as to snugly fit within the slots 67. The engagement between the arms and the pins is further strengthened against any movement by the presence of the springs and washers which function as clamps for retaining the arms in firm rigid relation to the frame. Further novelty of the construction resides in all of the parts of the regulator being entirely invisible from an operator or observer when the windshield is in closed position and when in open position the only portions that are visible are the outward ends of the arms 57 and 58.

While I have described and illustrated but a single embodiment of my invention it will be apparent to those skilled in the art that various changes, omissions, additions and substitutions may be made therein without departing from the spirit and scope of my invention as set forth in the accompanying claims.

I claim as my invention:

1. The combination with a windshield frame and an opening in a vehicle body for receiving said frame, flexible arms for engaging slots in said frame, means for pivotally supporting said arms in the same plane, said means being provided with notches, and projections on said arms engageable with said notches for retaining said arms in rigid relation to said supporting means.

2. The combination with a windshield frame and an opening in a vehicle body for receiving said frame, actuating arms for said windshield of a driving mechanism for the arms including a worm and sectors for operating shafts to which the arms are rigidly secured, the lower portion of the frame of the windshield being provided with slots, said slots being enlarged at their adjacent ends, and a single cover plate for closing the enlarged portions of said slots.

3. The combination with a windshield frame and an opening in a vehicle body for receiving said frame formed in the paneling wherein the cowl and dash are in continuous relation, of a windshield regulator mounted in concealed position under the cowl and dash in the vicinity of the opening, arms extending through apertures in said paneling and rigidly secured to said regulator, the windshield frame being provided with slots to which the ends of said arms are slidably secured, and means within the body for operating said regulator.

4. An automobile body having the cowl and dash panels formed in unit relation and having at least one slot therein, a windshield swingable from said panels, a windshield regulator disposed under said cowl and dash panels below said windshield, and at least one arm on said regulator extending through said slot in engagement with said windshield.

5. An automobile body having the cowl and dash panels formed in unit relation and provided with a rabbet to receive a windshield frame, a windshield regulator disposed under said cowl and dash panels, said rabbet having a slot through which an element of the regulator extends in engagement with the aforesaid windshield frame.

6. An automobile body having a cowl and dash panel formed in unit relation and preformed to provide a rabbet to receive a windshield frame, said rabbet having at least one slot therein, a windshield regulator disposed under said cowl and dash panel and provided with actuating arms, said arms extending through said slot in engagement with said windshield frame.

7. An automobile body having a cowl and dash panel formed in unit relation and having at least one slot therein, a windshield swingable from said panel, a windshield regulator disposed under said cowl and dash panel below said windshield, and at least one flexible arm on said regulator extending through said slot in engagement with said windshield for effecting its actuation.

ALFRED H. HABERSTUMP.